No. 828,329. PATENTED AUG. 14, 1906.
M. MOHR.
TOOTH FOR AGRICULTURAL IMPLEMENTS.
APPLICATION FILED MAY 19, 1906.
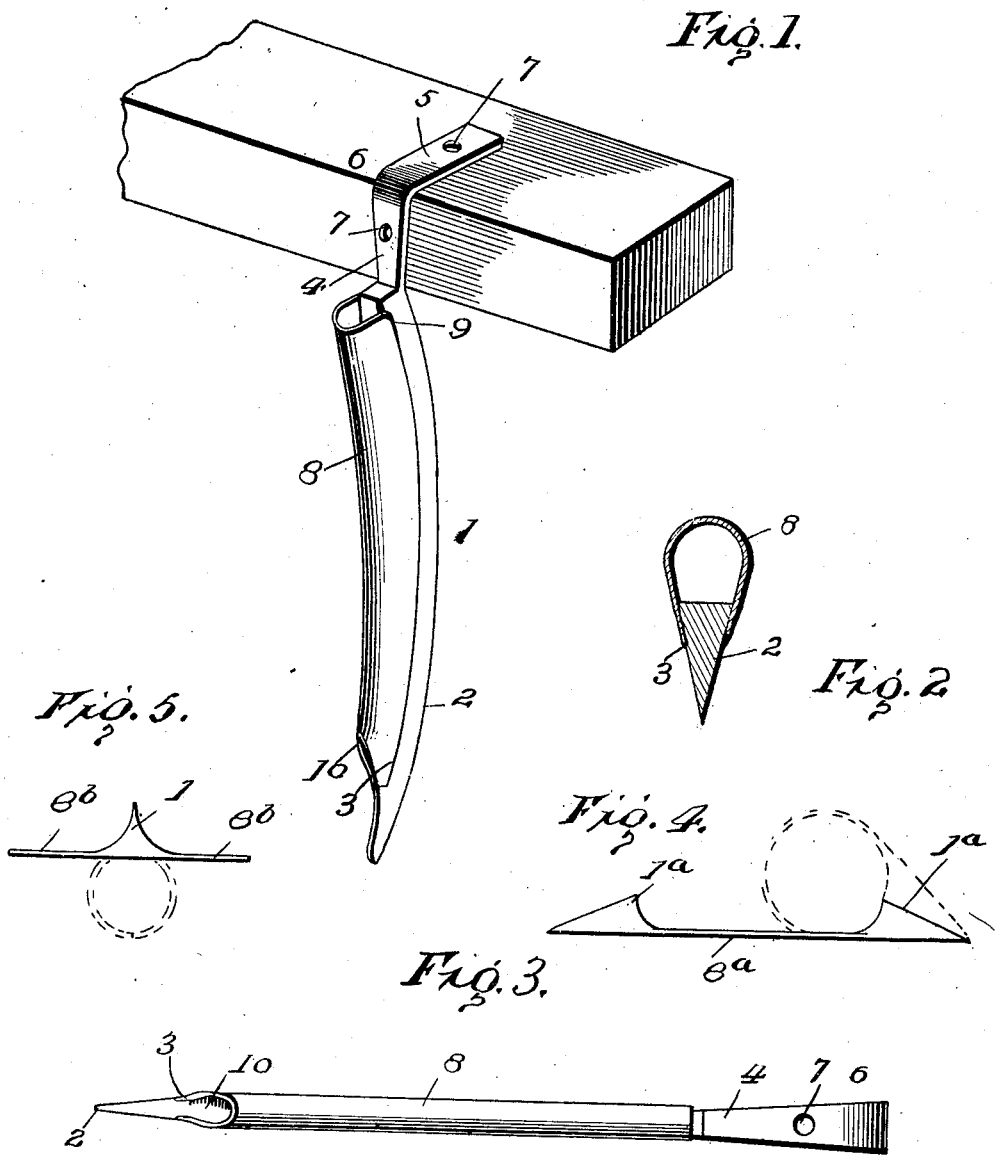
Witnesses
Inventor
M. Mohr.

UNITED STATES PATENT OFFICE.

MICHEL MOHR, OF WAHPETON, NORTH DAKOTA.

TOOTH FOR AGRICULTURAL IMPLEMENTS.

No. 828,329.   Specification of Letters Patent.   Patented Aug. 14, 1906.

Application filed May 19, 1906. Serial No. 317,707.

*To all whom it may concern:*

Be it known that I, MICHEL MOHR, a citizen of the United States, residing at Wahpeton, in the county of Richland and State of North Dakota, have invented certain new and useful Improvements in Teeth for Agricultural Implements, of which the following is a specification.

The object of the present invention is to provide an improved tooth for agricultural implements which can be employed with equal facility either in connection with a harrow or a seeder.

A further object of the invention is to so design the tooth that it will be very strong and durable in construction and can be very cheaply and economically manufactured.

For a full description of the invention and the merits thereof and also to acquire a knowledge of the details of construction of the means for effecting the result reference is to be had to the following description and accompanying drawings, in which—

Figure 1 is a perspective view of the improved tooth. Fig. 2 is a transverse sectional view through the same. Fig. 3 is a rear view. Fig. 4 is a transverse sectional view through a modification, showing it in the position assumed before being bent. Fig. 5 is a similar view of a second modification.

Corresponding and like parts are referred to in the following description and indicated in all the views of the drawings by the same reference characters.

The numeral 1 designates the body of the tooth, which has an approximately triangular cross-section and has its forward edge sharpened at 2. The lower end of the tooth has its rear side beveled or cut away at 3, the said cut-away portion preferably having a concave formation, as shown in the drawings. The upper end of the tooth is provided with an extension 4, which is flattened transversely and has the end thereof bent forwardly to form the arm 5. In securing the tooth to the frame of a harrow or seeder the arm 5 and extension 4 are placed against one of the bars 6 and secured in position by fastening members passing through perforations 7 in the said members. The rear portion 8 of the tooth is formed of a skelp or strip of sheet metal which is bent transversely upon itself and has an approximately U-shaped cross-section.

In the preferred construction (shown in Figs. 1, 2, and 3) the opposite arms of the sheet-metal member 8 are brazed or welded to opposite sides of the body 1 of the tooth, as shown at 9, and the longitudinal passage 10 is thus formed, through which the grain or seeds are adapted to pass. This skelp portion 8 extends down to the beveled portion 3 of the tooth and terminates somewhat above the extremity of the tooth. Attention is also directed to the fact that the tooth itself has a slight longitudinal curve and the lower end thereof extends slightly to the rear. When this tooth is connected to the frame of a seeder, it will be apparent that it will operate in the usual manner, the seeds passing through the tubular opening 10 and being deposited in the furrow formed by the tooth 1. This tooth also has the advantage that where the seed-dropping mechanism is omitted the device can also be used as a harrow.

A modified form is shown in Fig. 4, in which the skelp portion 8ª is provided at each end with an enlargement 1ª. These enlargements are so formed that when they are brought together by bending the skelp portions and then welded they will form the body portion, while the longitudinal passage 10 extends through the skelp portion.

A second modification is also disclosed in Fig. 5, where the body portion 1 is shown as provided at its rear edge with oppositely-projecting lateral flanges 8ᵇ, which are adapted to be bent rearwardly and brazed or welded in order to form the rear or skelp portion 8 of the tooth. In all the forms of the invention, however, the tooth comprises a body portion having its forward edge sharpened and a skelp portion formed of thin or sheet material through which the passage 10 extends.

Having thus described the invention, what is claimed as new is—

1. A tooth for agricultural implements comprising a body portion which is curved slightly to the rear and has an approximately triangular cross-section so that the forward longitudinal edge thereof is sharpened, the lower extremity of the body portion being beveled upwardly and to the rear, a skelp portion formed of thin material, the said skelp portion being bent and brazed to form a longitudinal passage extending along the back of the body portion, and an extension at the upper end of the tooth which is flattened transversely and has the end thereof bent forwardly, the said extension providing means whereby the tooth is secured in position.

2. A tooth for agricultural implements comprising a body portion which is curved slightly to the rear and which has an approximately triangular cross-section so that the forward longitudinal edge is sharpened, a rear portion formed of sheet material bent transversely upon itself so as to have an approximately U-shaped section, the arms of the rear portion being welded or brazed to the body of the tooth and a longitudinal passage thus formed along the back of the body, and an extension upon the body portion by means of which the tooth is secured in position.

3. A tooth for agricultural implements comprising a body portion which is curved slightly to the rear and has an approximately triangular cross-section so that the forward longitudinal edge thereof is sharpened, the rear side of the lower end of the body portion being beveled upwardly, a rear portion formed of sheet metal and bent upon iteslf transversely so as to have an approximately U-shaped section, the arms of the rear portion being brazed or welded to opposite sides of the body portion and a longitudinal passage thus formed along the back of the body portion, the said passage terminating somewhat above the point of the tooth, and an extension from the body portion by means of which the tooth is secured in position.

4. A tooth for agricultural implements comprising a body portion which is curved slightly to the rear and has an approximately triangular cross-section so that the forward longitudinal edge thereof is sharpened, the lower extremity of the body portion being beveled upwardly and to the rear, a rear portion formed of a strip of sheet metal which is bent upon itself transversely so as to have an approximately U-shaped section, the opposite arms of the sheet-metal portion being welded to opposite sides of the body portion and a longitudinal passage thus formed which extends along the back of the body portion and terminates somewhat above the point of the tooth, and an extension at the upper end of the tooth which is flattened transversely and has the end thereof bent forwardly, the said extension providing means whereby the tooth is secured in position.

In testimony whereof I affix my signature in presence of two witnesses.

MICHEL MOHR. [L. S.]

Witnesses:
 STEPHEN BEAMER,
 CHAS. L. MIKKELSON.